(12) United States Patent
Liu (10) Patent No.: US 10,178,439 B2
(45) Date of Patent: *Jan. 8, 2019

(54) MANAGING INTERACTIVE SUBTITLE DATA

(71) Applicant: Alibaba Group Holding Limited, George Town (KY)

(72) Inventor: Yacheng Liu, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,369

(22) Filed: Sep. 22, 2017

(65) Prior Publication Data

US 2018/0014079 A1 Jan. 11, 2018

Related U.S. Application Data

(63) Continuation of application No. 15/253,265, filed on Aug. 31, 2016, now Pat. No. 9,807,466, which is a
(Continued)

(30) Foreign Application Priority Data

Jun. 19, 2014 (CN) .......................... 2014 1 0277306

(51) Int. Cl.
*H04N 21/488* (2011.01)
*H04N 21/43* (2011.01)
(Continued)

(52) U.S. Cl.
CPC ....... *H04N 21/4884* (2013.01); *H04N 21/435* (2013.01); *H04N 21/4307* (2013.01); *H04N 21/4856* (2013.01); *H04N 21/8146* (2013.01)

(58) Field of Classification Search
CPC ........... H04N 21/4884; H04N 21/4307; H04N 21/435; H04N 21/4856; H04N 21/8146
See application file for complete search history.

(56) References Cited

U.S. PATENT DOCUMENTS 5,497,241 A 3/1996 Ostrover
5,684,542 A 11/1997 Tsukagoshi
(Continued)

FOREIGN PATENT DOCUMENTS

| CN | 1914903 A | 2/2007 |
|---|---|---|
| JP | 2005124169 | 5/2005 |
| JP | 2008148071 | 6/2008 |

*Primary Examiner* — Oleg Asanbayev
(74) *Attorney, Agent, or Firm* — Van Pelt, Yi & James LLP (57) ABSTRACT

Embodiments of the present application relate to a method, apparatus, and system for processing subtitle data. The method includes dividing subtitle data into multiple subtitle groups according to subtitle data display time information related to a played object, wherein a subtitle group comprises at least one subtitle data entry, and wherein a subtitle data entry comprises subtitle content, a subtitle display time in relation to the played object, and a speed of subtitle motion, selecting a piece of subtitle data from a subtitle group according to the display time information of the played object, and causing the selected piece of subtitle data to be displayed on a track such that the selected piece of subtitle data does not overlap with or pass another piece of subtitle data displayed on the track.

25 Claims, 6 Drawing Sheets

Related U.S. Application Data continuation of application No. 14/741,854, filed on Jun. 17, 2015, now Pat. No. 9,462,352.

(51) Int. Cl.
*H04N 21/435* (2011.01)
*H04N 21/485* (2011.01)
*H04N 21/81* (2011.01)

(56) References Cited

U.S. PATENT DOCUMENTS

| | | | |
|---|---|---|---|
| 5,731,847 A | 3/1998 | Tsukagoshi | |
| 6,424,792 B1 | 7/2002 | Tsukagoshi | |
| 7,826,714 B2 | 11/2010 | Berstis | |
| 8,437,599 B2 | 5/2013 | Seo | |
| 2005/0078221 A1 | 4/2005 | Kobayashi | |
| 2005/0108026 A1* | 5/2005 | Brierre | G06Q 30/02 725/137 |
| 2005/0207442 A1 | 9/2005 | Zoest | |
| 2006/0210245 A1 | 9/2006 | McCrossan | |
| 2007/0166005 A1 | 7/2007 | Berstis | |
| 2007/0280644 A1 | 12/2007 | Seo | |
| 2009/0066839 A1 | 3/2009 | Jung | |
| 2010/0232762 A1 | 9/2010 | Kendall | |
| 2011/0019088 A1 | 1/2011 | Kase | |
| 2011/0305432 A1* | 12/2011 | Manabe | H04N 21/44008 386/244 |
| 2012/0072220 A1 | 3/2012 | Zhang | |
| 2012/0201514 A1 | 8/2012 | Kang | |
| 2012/0288255 A1 | 11/2012 | Yang | |
| 2013/0100348 A1* | 4/2013 | Chen | H04N 7/0885 348/468 |
| 2013/0202270 A1 | 8/2013 | Neelakant | |
| 2014/0068687 A1 | 3/2014 | Greenberg | |
| 2014/0098289 A1 | 4/2014 | Jang | |
| 2014/0111688 A1 | 4/2014 | Suvorov | |
| 2014/0140681 A1 | 5/2014 | Lee | |
| 2014/0157149 A1 | 6/2014 | Nishizawa | |
| 2018/0084298 A1* | 3/2018 | Tsukagoshi | H04N 21/431 |

* cited by examiner

MANAGING INTERACTIVE SUBTITLE DATA

CROSS REFERENCE TO OTHER APPLICATIONS

This application is a continuation of U.S. patent application Ser. No. 15/253,265, entitled MANAGING INTERACTIVE SUBTITLE DATA filed Aug. 31, 2016 which is incorporated herein by reference for all purposes, which is a continuation of U.S. patent application Ser. No. 14/741,854, entitled MANAGING INTERACTIVE SUBTITLE DATA filed Jun. 17, 2015, now U.S. Pat. No. 9,462,352, which is incorporated herein by reference for all purposes, which claims priority to People's Republic of China Patent Application No. 201410277306.1 entitled A METHOD AND A SYSTEM OF PROCESSING SUBTITLE DATA, filed Jun. 19, 2014 which is incorporated herein by reference for all purposes.

FIELD OF THE INVENTION

The present application relates to a technical field of subtitle data management. In particular, the present application relates to a method, a device, and a system of managing subtitle data.

BACKGROUND OF THE INVENTION

There are now many interactive audio programs and/or video programs (hereinafter abbreviated as audio/video programs) provided on audio/video websites that can display user-submitted comments as subtitle data. The subtitle data is generally displayed in motion directly on the audio/video player window corresponding to the audio/video program. Because user subtitle data can be displayed in motion on the audio/video player window, users can interact with the program and become more engaged while viewing audiovisual content or listening to audio and can increase the users' understanding of the audio/video content. The subtitle data display technology in which user subtitle data is displayed in motion on the audio/video player window is generally referred to as subtitle data moving display technology. The subtitle data moving display technology provides a moving display of the subtitle data published by the user at the same moment in or at different time periods in played audiovisual or audio content.

As the number of participating users increases, the subtitle data volume corresponding to the audio/video content becomes increasingly large. An issue associated with subtitle data moving display technology has become how to provide a complete subtitle data motion algorithm to solve the problem of determining a kind of tracks and time points that the subtitle data is to follow so as to determine the course of subtitle data motion on the screen. According to some related art of subtitle data moving display technology, the following approaches to implementing moving display of subtitle data are typical:

A first method to implement moving display of subtitle data includes dividing a designated zone of the screen in one screen direction into multiple rows of tracks, randomly selecting tracks, randomly selecting subtitle data, and placing the subtitle data on the tracks for processing. The initial position of the coordinates at which all the screen data starts to move is the width of the designated zone. In the process of displaying subtitle data in motion, when the speeds of motion of various subtitle data are inconsistent, and when an excess of subtitle data exists, different pieces of subtitle data can overlap.

A second method to implement moving display of subtitle data includes dividing a designated zone of the screen in one screen direction into multiple rows of tracks, randomly selecting data, and placing the selected data on a blank track for motion. The selected subtitle data is played on the blank track for display in motion as long as the track does not have subtitle data. Because only randomly selected subtitle data is placed in blank tracks, the track is not fully utilized, and the subtitle data cannot be accurately matched with the audio/video. Consequently, when, in the subtitle data motion process, there is too much subtitle data for display, a lot of the subtitle data cannot be displayed on the screen. Therefore, some related art is not satisfactory when applied to audio/video with large volumes of subtitle data.

In summary, there is a need for a method, device, and system for better managing subtitle data.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a terminal generally refers to a device used (e.g., by a user) within a network system and used to communicate with one or more servers. According to various embodiments of the present disclosure, a terminal may include communication functionality. For example, a terminal may be a smart phone, a tablet computer, a mobile phone, a video phone, an e-book reader, a desktop Personal Computer (PC), a laptop PC, a netbook PC, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), or the like.

According to some embodiments of the present disclosure, a terminal includes a smart home appliance with communication functionality. A smart home appliance can be, for example, a television, a Digital Video Disk (DVD) player, an audio device, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, or the like.

According to various embodiments of the present disclosure, a terminal can be any combination of the foregoing terminals. In addition, it will be apparent to one having ordinary skill in the art that a terminal according to various embodiments of the present disclosure is not limited to the foregoing terminal.

Various embodiments of the present disclosure include a method and a device (e.g., a terminal or a server) for managing subtitle data. In some embodiments, subtitle data is selected and configured for display on subtitle tracks. The subtitle data is configured according to a speed of motion at which the selected subtitle data or existing subtitle data (e.g., subtitle data that is already provided on the track) is displayed on the tracks or a length of the selected subtitle data or the existing subtitle data.

Generally, audio/video sources are categorized as audio/video on demand or as direct-broadcast audio/video. These two types of audio/video sources are introduced separately below.

Audio/video on demand permits users to order audio and video as needed. For example, there are the various kinds of audio and video provided by audio/video service providers that users can view via web pages, mobile applications, audio/video playing software, plug-ins, and clients and that the users can play repeatedly. In the on-demand process for this audio and video that may be replayed at any time, users are generally permitted to publish user comments and other data and information during viewing. A large number of users can enter comments and other data information through clients or text boxes provided by web pages or other interfaces.

Direct-broadcast audio and video generally have a stronger time dimension. For example, the direct-broadcast audio and video are broadcast within a specified time period and do not allow users to play the direct-broadcast audio and video according to user needs. Examples of content that is provided as direct-broadcast audio and video include news, athletic contests, or the like that are being directly broadcast. In the direct broadcasting process, users are generally permitted to publish user comments and other data information while viewing in order to boost interactivity.

Various embodiments of the present disclosure include a method and device for collecting subtitle data (e.g., a piece of subtitle data). For example, various embodiments include a method and device for collecting user comments and other data and information submitted during viewing. The user comments and other data and information submitted during viewing can be submitted during on-demand playback or during a direct-broadcast (e.g., a live broadcast).

A piece of subtitle data includes subtitle content.

A subtitle data entry corresponds to information associated with a played object content (e.g., video content). The subtitle data entry can be stored in a database in connection with the played object content. The subtitle data entry can include characteristics of a piece of subtitle data. For example, the subtitle data entry can include a subtitle font or font size information, subtitle publication time points, subtitle content, a subtitle display time in relation to the played object, and a speed of subtitle motion.

Figure 1:
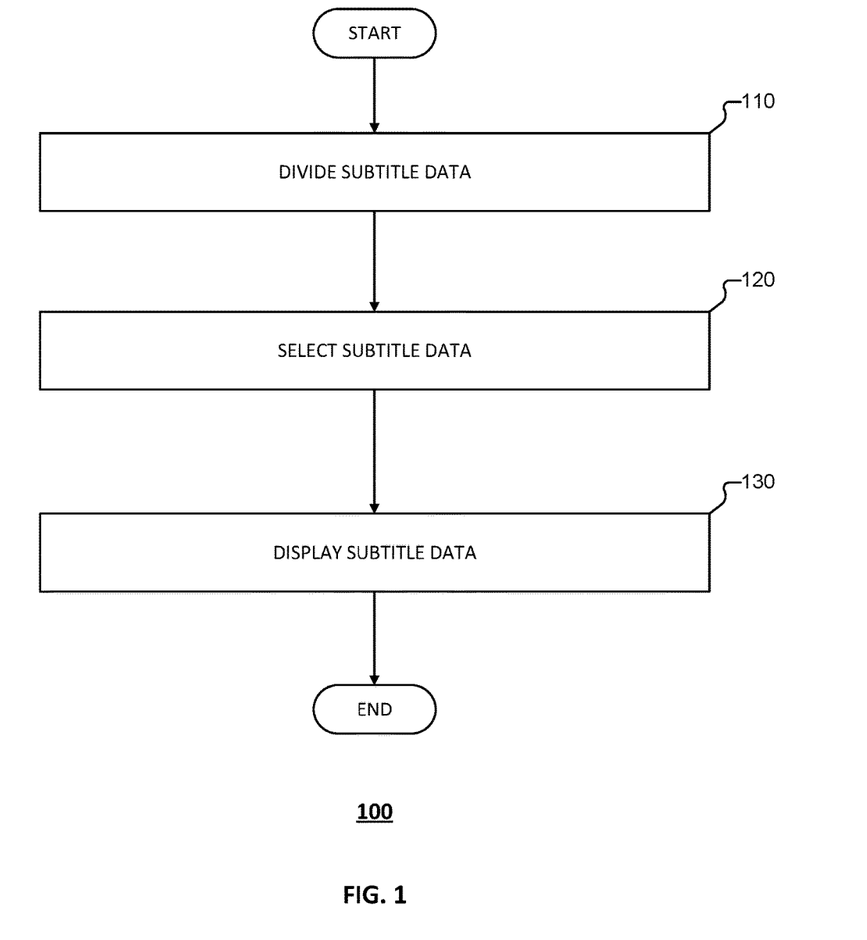
FIG. 1 is a flowchart of a method of processing subtitle data according to various embodiments of the present application.

FIG. 1 is a flowchart of a method of processing subtitle data according to various embodiments of the present application.

Moreover, the embodiment can be executed by a played object client, or it can be executed by a server that provides played object content. A played object client can correspond to a terminal that plays the played object content. For example, the played object client can be a terminal that processes the played object content and displays the played object content or outputs the played object content to a display. The played object content can correspond to a video comprising audio and image data. As an example, the played object content can be video content that is played by a terminal.

Referring to FIG. 1, a process 100 for managing subtitle data is provided. In some embodiments, process 100 can be implemented by system 500 of FIG. 5. Process 100 can be implemented by a client on which content is played or by a server that provides the content that is played.

At 110, subtitle data is divided. Subtitle data can include comments entered by users who are listening to or viewing the displayed content, as well as other content-related data such as closed captions. The subtitle data is divided into multiple subtitle groups. In some embodiments, the subtitle data is divided according to subtitle data display time information as the subtitle data display time information relates to the played object (e.g., content). Each subtitle group includes at least one subtitle data entry and each of the subtitle data entries includes subtitle content, the subtitle data display time in relation to the played object, and the speed of subtitle motion.

The subtitle data can be collected in advance, or the subtitle data can be collected in steps while the played object is being played and obtained through continual updating. In some embodiments, the subtitle data is collected from users via user interfaces provided by the browser or other application, which sends the subtitle data to one or more servers. The played object may be audio or video files. In the event that the subtitle data corresponding to the played object is collected, some improper subtitle data can be filtered out in advance. For example, the improper subtitle data can be filtered out contemporaneously with the collection of the subtitle data by checking for a list of inappropriate words in the subtitle data.

A time point can correspond to a point in time relative to the played object. For example, the time point can be measured relative to the beginning of the content corresponding to the played object. A publication time point can correspond to the specific time point at which this subtitle information was published by the user.

In some embodiments, the subtitle groups are determined according to the play time length of the played object. For example, the subtitle groups can depends on the system initialization settings. One second of data (e.g., the played object) can be divided into a group, and one minute of data also can be divided into a group. In some embodiments, shorter time gaps used in determining the subtitle groups result in higher computational complexity associated with determining the subtitle groups, and higher consumption of the system resources. For example, in the event that shorter time gaps are used in determining the subtitle groups, the played object will be divided into many groups. In some embodiments, longer time gaps result in less computational complexity associated with determining the subtitle group, and less consumption of system resources. However, in the event that longer time gaps are used in determining the subtitle groups, the matching between the content of the subtitles and the played object is less accurate. For example, if longer time gaps are used in determining the grouping, the subtitle content can be presented over a longer period of time during playback and thus the subtitle content can be untimely relative to the specific portion of the played content to which the subtitle content relates. In some embodiments, the time gap used in determining the subtitle groups is between 20 seconds to 1 minute can be. Table 1 provides an example of subtitle data collected in connection with a played object. As shown in Table 1, assuming that the play time length for the played object is 30 minutes, a time length of two minutes can be selected as one subtitle group. The subtitle data can be divided into multiple subtitle groups. Referring to Table 1 as an example, the subtitle group corresponding to the time from minute 5 (as measured from the beginning of the video) to minute 7 could be subtitle group G1, the subtitle group corresponding to time from minute 9 to minute 11 could be subtitle group G2, and the subtitle group corresponding to time from minute 11 to minute 13 could be subtitle group G3. Assume that there are currently 11 subtitle data entries, from C1 to C11, as shown in Table 1. Subtitle data entries C1 through C11 can be separately placed in the three subtitle groups G1 through G3 according to the subtitle display time in relation to the played object. The audio/video time points 00:05 to 00:07 span two minutes. Thus, the subtitle data entries that are associated with audio/video time points 00:05 to 00:07 (e.g., C1, C2, C3, C4, C5 and C6 which are generated during these two time points) are assigned to subtitle group G1. The audio/video play time points of 00:07 to 00:09 do not have any corresponding subtitle data entries. The subtitle data entries that are associated with audio/video time points 00:09 to 00:11 (e.g., C7, C8, and C9) are assigned to subtitle group G2. The subtitle data entries that are associated with audio/video time points 00:11 to 00:13 (e.g., C10 and C11) are assigned to subtitle group G3. According to various embodiments, various other lengths of time by which to divide subtitle groups can be used. For example, if the length of times used to divide subtitle groups are three minutes, 10 subtitle groups would defined. As another example, if the length of time used to divide subtitle groups is one minute, 30 subtitle groups would be defined.

In some embodiments, the quantity of subtitle groups may also be determined according to the number of subtitle data entries. If the number of subtitle entries is relatively large, then more subtitle groups may be defined. The server or client terminal can determine the number of subtitle data groups. When the quantity of subtitle groups is being determined, the power consumption and processing capacities of terminals or servers and other such factors may also be balanced in order to optimize the subtitle data display technology.

In some embodiments, subtitle data can be first divided into multiple subtitle groups according to subtitle data display time information as such information relates to the played object. Each subtitle group is required to comprise at least one subtitle data entry and any subtitle group that has no subtitle data entry is removed from the list.

The data of Table 1 can be collected in advance, or it may be collected in steps and continually updated. For example, in the event that new subtitle data is collected, subtitle data display time information in relation to the played object can serve as a basis for determining whether a corresponding subtitle group exists. If a corresponding subtitle group exists, the newly collected subtitle data is added to the corresponding subtitle group. If no corresponding subtitle group exists, a new subtitle group is established, and the newly collected subtitle data is added to the newly established subtitle group. For example, if the display time information in relation to the beginning of the played object subtitle data C0 is 00:04:08, then no corresponding subtitle group currently exists. Thus, a new subtitle group G0 corresponding to 00:04-00:06 can be established, and C0 will be added to subtitle group G0. As another example, if the display time of subject data C12 is 00:08:05 and no corresponding subtitle group currently exists, a new subtitle group G4 corresponding to 00:07-00:09 is established and C12 is added to this group.

TABLE 1

| Subtitle group | Sub-title | Publication time point | Display time in relation to the played object | Speed | Sub-title length |
|---|---|---|---|---|---|
| Subtitle group G1 00:05-00:07 | C1 | 20140106-10:00:05 | 00:05:05 | Speed(C1) | len(C1) |
| | C2 | 20140104-10:00:05 | 00:05:25 | Speed(C2) | len(C2) |
| | C3 | 20140111-10:00:05 | 00:05:30 | Speed(C3) | len(C3) |
| | C4 | 20140103-10:00:05 | 00:06:20 | Speed(C4) | len(C4) |
| | C5 | 20140103-10:00:05 | 00:06:25 | Speed(C5) | len(C5) |
| | C6 | 20140103-9:00:05 | 00:06:55 | Speed(C6) | len(C6) |
| Subtitle group G2 00:09-00:11 | C7 | 20140103-10:00:05 | 00:10:25 | Speed(C7) | len(C7) |
| | C8 | 20140103-9:00:05 | 00:10:55 | Speed(C8) | len(C8) |
| | C9 | 20140103-9:00:05 | 00:10:55 | Speed(C9) | len(C9) |

TABLE 1-continued

| Subtitle group | Subtitle | Publication time point | Display time in relation to the played object | Speed | Subtitle length |
|---|---|---|---|---|---|
| Subtitle group G3 00:11-00:13 | C10 | 20140103-10:00:05 | 00:12:25 | Speed(C10) | len(C10) |
| | C11 | 20140103-9:00:05 | 00:12:55 | Speed(C11) | len(C11) |

In some embodiments, the subtitle data comprises subtitle content, subtitle display time in relation to the played object, speed of subtitle motion, and other such information. Referring to subtitle C1 in Table 1 as an example, assume that the length of played object play time is 15 minutes. A user (e.g., user A) starts viewing at the played object at 10:00:05 on Jan. 6, 2014 and publishes comment data associated with the played object (e.g., subtitle C1), when 5 minutes 5 seconds of the video have been played. The length of the subtitle C1 is len(C1). The length of the subtitle can determined by the number of characters and character width. In some embodiments, the subtitle data comprises the same number of characters regardless of the packet length (e.g., the time gaps used in determining the groups). For example, the length of the subtitle is associated with a number of characters rather than a length of time associated with the corresponding group. In some embodiments, during system initialization, len number (c1) is set to equal the number of characters multiplied by a single character width. After subtitle C1 is collected, the content of the subtitle and the subtitle play time in relation to the played object are recorded, and the speed of subtitle motion, speed(C1), and other such information can be set.

In some embodiments, the subtitle data and other information can be stored in a table or database associated with the played object. The table or database can store a mapping between the subtitle group and other information such as the subtitle, the publication time point, the display time, the speed, the subtitle length, or the like.

In the event that the subtitle display time in relation to the played object is to be recorded, the subtitle display time can be determined according to the play time information (e.g., the play time axis or play progress bar) for the current played object, or the subtitle display time can be determined according to the difference between the user subtitle publication time and the view start time. The subtitle display time can be determined according to the difference between the user subtitle publication time and the view start time in the event that the played object is continuously viewed by the user (e.g., the played object is viewed at a normal speed without fast-forwarding, slowing, or pausing the progress of play). The subtitle display time can correspond to the time at which the subtitle data is displayed. Referring to Table 1 and using user A as an example, if user A starts viewing at 10:00:05 on Jan. 6, 2014 and publishes subtitle C1 when 5 minutes 5 seconds of the video have played, the subtitle display time in relation to the played object at this time is 5 minutes 5 seconds. The display time of subtitle C1 in relation to the played object is 5 minutes 5 seconds. In some embodiments, the display time of the subtitle can be adjusted to compensate for the possible delay of the user-published subtitle in relation to the played object. For example, a user publishes a comment in relation to a segment of the played object, however, the played object has already played for some time at the time of publication. For example, publishing a subtitle can take two minutes. The delay in the publishing of the subtitle can be caused by the time that a user takes to enter the text. In this case, the subtitle display time in relation to the played object can be further optimized. The subtitle display time in relation to the played object can be reduced in consideration of the subtitle length (e.g., the longer the subtitle, generally the more time needed for input). For example, in the event that the user publishes subtitle C1 upon the played object playing for 5 minutes 5 seconds, the length of the subtitle, len(C1), can serve as a basis for determining that on average the user may have needed time T1 for input. Assume that the time that the user required to input the subtitle C1 is one minute. In this case, the subtitle display time in relation to the played object is 5 minutes 5 seconds less 1 minute (e.g., 4 minutes 5 seconds). To simplify the description, in other parts of the present application embodiment, only the time of user publication of subtitle data is used to determine the subtitle display time in relation to the played object. In some embodiments, user settings or preferences can be used to determine, or otherwise estimate, the time used to input a subtitle based on the length of the subtitle. The length of the subtitle can be determined according to a number of characters in the subtitle.

In some embodiments, in order to display as much of the subtitle as possible on the subtitle track, the speed of subtitle motion is proportional to the length of subtitle content. For example, the longer the subtitle, the faster the corresponding speed of motion needs to be in order for the longer subtitle to be fully displayed. Problems such as excessively slow display which affects the audio/video user's browsing and results in excessively long wait times (and even the absence of any track space for display) are thus avoided.

In some embodiments, to simplify calculations and avoid the problem of large quantities of subtitles resulting in complex subtitle speed calculations, the ratio of the subtitle data length (len) to the speed of motion (Speed) is the value t according to Equation 1. In various implementations, t can represent the amount of time for a character in a dynamically moving subtitle to travel from one end of the display window to the other, or the amount of time a statically displayed block of subtitle text is shown on screen. In various implementations, t can be configured according to system or use settings/preferences.

$$t = \frac{\text{len}}{\text{Speed}}. \tag{1}$$

Referring to Equation 1, the t value can be adjusted according to actual video/audio playing need. For example, subtitle display effects can be enhanced according to one or more factors of the following factors: subtitle speed and display effects (e.g., if the subtitle is displayed too fast, a user may be unable to see the subtitle clearly; conversely, if the subtitle is displayed too slow, user experience is affected adversely as large quantities of subtitle data cannot be displayed fully), whether track space can be used (as much as possible to avoid situations in which tracks are displaying no subtitles), subtitle quantity, and mean length of subtitle. Thus, subtitle speed can be determined (e.g., calculated) using (e.g., as a function of) subtitle length and the t value. Using subtitle C1 as an example, the speed of motion of subtitle C1 is determined using Equation 1 such that Speed (C1)=len(C1)/t.

In some embodiments, a font of the subtitle can be configured to enhance user experience. For example, the font of the subtitle can be a fixed size and type, such that the subtitle is displayed as a default font and default font size. The default font and default font size can be configured by a user or a server according to user preferences or user settings. To enrich the forms of expression for user-published comment data, the subtitle data can include subtitle font and/or font size information. Accordingly, the length of the subtitle data can be calculated at least partially based on the font and/or font size of the corresponding subtitle data. For example, the length of the subtitle data can be calculated using the number of characters included in the subtitle data, or even more precisely calculated using the number of characters included in the subtitle data multiplied by font size.

In some embodiments, the subtitle data can include the current time information associated with the time at which the subtitle was published in order to enhance the display of subtitle data. For example, when a user publishes subtitle information, the current time information (e.g., the specific time point at which this subtitle information was published by the user) is acquired. For example, the user for subtitle C1 published the subtitle data at 10:00:05 on Jan. 6, 2014.

At 120, a portion of the subtitle data is selected. The subtitle data from a subtitle group according to the play time information of the played object can be selected. In some embodiments, the selected subtitle can be displayed on a track (e.g., during playback of the played object). The selected subtitle data can be displayed on a track. In some embodiments, the subtitle data is selected according to publication date (e.g., more recently published subtitle data is displayed). In some embodiments, the subtitle data is selected according to ratings such as peer review or the like. If the subtitle data is selected according to ratings, subtitle data having a higher (e.g., highest) rating can be displayed. In some embodiments, the subtitle data is selected according to the user that published the subtitle data. For example, during playback, a user can view subtitle data published by a specific user.

When the subtitle data is displayed on the track, the process of displaying the subtitle data on the track can configure the display of the subtitle data according to a speed of subtitle motion such that the subtitle content that is to be displayed later on the track (e.g., displayed in back on the same track) does not pass the subtitle content that is to be displayed earlier on the track (e.g., displayed in front on the same track).

In some embodiments, the subtitle data is selected for the current broadcast schedule (e.g., the current played object) by selecting the subtitle of the current group, and selecting subtitle data from among subtitle data of the selected group according to the publication time associated with the subtitle data. For example, a most recently published subtitle data from a selected group can be selected for display in a track. In the event that subtitle data is selected, then equations (2) or (3) can be used to check whether the selected subtitle data is consistent with the operating conditions. In the event that the selected subtitle data is not consistent with the operating conditions, then another subtitle data can be selected from within the selected group, or another track can be used to display the selected subtitle data (e.g., if the subtitle data is consistent with the operating conditions of the other track). In some embodiments, data that is not consistent with the operating condition of any tracks is discarded.

At 130, the selected portion of subtitle data is caused to be displayed. The subtitle data selected at 120 can be displayed in connection with the corresponding portion of display object content. For example, the selected subtitle data is displayed on the track. In the event that the subtitle data is displayed on the track, the speed of subtitle motion is referenced so as to ensure that subsequent subtitle content displayed does not pass, or otherwise overlap, previous subtitle content displayed on the same track. In the event that the subtitle data is divided and selected by a server, causing the display of the subtitle data includes providing the subtitle data to a terminal on which the selected subtitle data is displayed. For example, the selected subtitle data can be communicated to a client terminal that displays the associated content.

The track is used in the display of subtitle data. For example, subtitle data can move from one end of the track to the other end, thereby achieving display of the subtitle for the convenience of user browsing and viewing. The configuring of the tracks and subtitle display on the tracks may be realized using existing subtitle display implementations. For example, within the designated zone for displaying subtitles corresponding to the played object, a coordinate system is set up and divisions are made in one screen direction. The one screen direction can be along a vertical axis of the screen, along a horizontal axis of the screen, or along a diagonal direction of the screen. The division of the designated zone can be parallel to the vertical axis such that the division extends from the positive direction of the vertical axis to the negative direction, or from the negative direction of the vertical axis to the positive direction. The division of the designated zone can be to the horizontal axis such that the division extends from the positive direction of the horizontal axis to the negative direction, or from the negative direction of the horizontal axis to a positive direction. The following description uses only the example of tracks that are parallel to the horizontal axis and that go from the positive direction of the horizontal axis to the negative direction for the purpose of explaining various implementations. Other implementations and configurations of tracks are possible.

Figure 2:
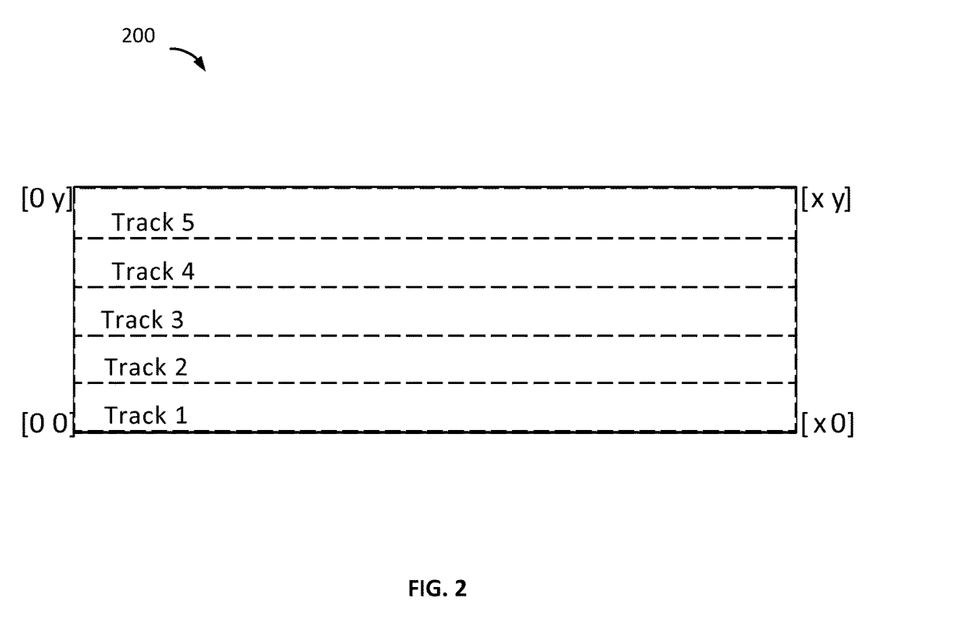
FIG. 2 is a diagram of a designated zone of a display screen corresponding to a played object according to various embodiments of the present application.

FIG. 2 is a diagram of a designated zone of a display screen corresponding to a played object according to various embodiments of the present application.

Referring to FIG. 2, a designated zone 200 is provided. Designated zone 200 can be displayed on a client terminal's screen as a part of the browser and/or audio/video display application.

As illustrated in FIG. 2, the designated zone 200 of the screen is a rectangular zone formed on the screen. The designated zone can be formed using coordinates. The coordinates can relate to coordinates of pixels or the like. For example, a rectangular zone formed from the coordinates {[0,0]; [x,0]; [0,y]; [x,y]} is illustrated. The rectangular zone is divided into at least one track in a direction parallel to the horizontal axis. The tracks are configured to be parallel to the horizontal axis after the rectangular zone is divided. The subtitle data moves from the positive direction relative to the horizontal axis of the designated zone to the negative. (e.g., the subtitle data moves from right to left). In some embodiments, other configurations are possible. For example, the direction in which the subtitle data moves can be configurable according to user preferences, a jurisdiction associated with the content (e.g., a jurisdiction in which the content is licensed), a jurisdiction of the user, a language of the subtitle data, or the like. The subtitle data can move from right to left, from left to right, from top to bottom, or from bottom to top according to system configurations, or according to user or system settings/preferences. The heights of the tracks can be configurable. For example, the height of the tracks can be set according to need, such as font size, or according to whether the inter-track gap between displayed subtitle data affects user browsing. In some embodiments, the origin point of the designated zone is on the left side, and the width of the screen designated zone is x. For example, the selected subtitle data C1 issues (e.g., starts) from the coordinate x on the horizontal axis. Thus, the horizontal axis coordinate when the subtitle data C1 issues is x. According to various embodiments, the selected screen data can issue at various other locations (e.g., other locations on the horizontal axis), and thus can have various other coordinates at the time when the selected screen data issues. For example, in the event that the screen is divided along the vertical axis, and assuming that the origin point of the screen designated zone is on the lower side, and that the width of the screen designated zone is y, then the subtitle data C1 issues from vertical axis coordinate y. Accordingly, the vertical axis coordinate at which the subtitle data C1 issues is y.

The subtitle data in a subtitle group is selected according to the play time information of the played object for display on a track. Referring to the subtitle data of Table 1 as an example, if the current play time of the played object is 00:05:05 (e.g., when the played object has played for 5 minutes and 5 seconds, or 5 minutes and 5 seconds from the beginning of the played object), the corresponding subtitle group is G1. Accordingly, subtitle data is selected from among subtitle data C1, C2, C3, C4, C5 and C6 in subtitle group G1, and the selected subtitle data may be used for display on a track. Because the subtitle data display time in relation to the played object in subtitle group G1 ranges from 00:05 to 00:07, subtitle data can be selected from subtitle group G1 and displayed on a track when the playing of the played object reaches this time range. As a result, the selected subtitle data can correspond to the current play content of the played object.

In some embodiments, if multiple subtitle data exists within a subtitle group, subtitle data can be selected according to a corresponding publication time (e.g., date of publication). For example, the subtitle data can be selected such that the most recently published subtitle data is selected. The selection can enhance, or otherwise improve, the timeliness (e.g., a measure of how current the subtitle data is) of display. For example, in the event that subtitle data is selected from subtitle data C1, C2, C4, C5 and C6 of subtitle group G1, the subtitle data display sequence in subtitle group G1 can be determined according to the subtitle publication time points as subtitle data C1, C2, C4, C5 and C6. In addition, assuming that in the event that the selected subtitle data C2 is placed on a track for display, a new piece of subtitle data, C3, which belongs to the same subtitle group G1, is collected (e.g., received and stored) at this time. C3 is placed in the currently displayed subtitle group (e.g., the same subtitle group as C1, C2, C4, C5 and C6). Because priority display is given to the most recently published subtitle data, the display priority level of subtitle data C3 is higher than subtitle data C4, which has not yet been displayed. If multiple newly collected subtitle data similar to subtitle data C3 exists, the newly collected subtitle data can be given priority display.

In some embodiments, too much subtitle data can be associated with a played object. Too much subtitle data exists if not all subtitle data associated with the played object can be displayed on a track during playback of the played object. Too much subtitle data can exist if not all the subtitle data associated with a particular time period of the played object can be displayed (e.g., in a manner that is readable to a human user) on a track during playback of the played object. In some embodiments, excess subtitle data is discarded. For example, subtitle data in excess of the subtitle data that can be displayed in connection with a played object according to operating conditions can be discarded. In the event that the subtitle data selected from the subtitle group is used for display on a set of tracks, and too much subtitle data exists, display of all the subtitle data is not possible according to the play time information of the played object (e.g., when the display time span corresponding to the subtitle group cannot display all of the subtitle data in the subtitle group), the subtitle data belonging to a particular subtitle group that is not displayed needs not be displayed after the playback of the played object has passed through the display time span corresponding to the particular subtitle group. For example, if too much subtitle data exists in the selected subtitle data, in order for all of the selected subtitle data to be displayed, the display of the selected subtitle data will be displayed in time periods beyond the time period corresponding to the subtitle group from which the subtitle data is selected. For example, if the playback of the played object has reached 00:08, display of the undisplayed subtitle data in group G1 is not needed. In other words, assuming that the playback of the played object has reached 00:08 and the subtitle data C5 and C6 have not been displayed during playback of the played object through the time corresponding to subtitle group G1, C5 and C6 are not displayed during playback of the played object. Rather, display of the subtitle data can proceed to the next subtitle group according to the play time information. Display of certain subtitle data associated with a played object (e.g., in a particular subtitle group) can be deemed not possible if such subtitle data cannot be displayed in a manner that is readable (e.g., understandable) by a human user viewing the playback of the played object. In some embodiments, an indication can be provided that indicates that some subtitle data within the subtitle group has not been displayed. During or after playback of the played object, the user can be provided with an option to display the subtitle data that has not been displayed. For example, a dialog box can be displayed on a user interface.

In this example, the subtitle data is displayed on a set of tracks. In some embodiments, the subtitle data is displayed such that the subtitle content to be displayed later (e.g., displayed in back on the same track) is not displayed in front of, or overlapped with, the subtitle content displayed earlier (e.g., displayed in front on the same track). In the context of FIG. 2 and in the event that the subtitle scrolls from the right side of a track to the left side of the track (e.g., from [x,0] of Track 1 to [0,0] of Track 1), the subtitle content displayed earlier (e.g., displayed in front on the same track) corresponds to content that is displayed earlier or closer to [0,0] than other content (e.g., content that is displayed later or displayed in back on the same track).

Figure 3:
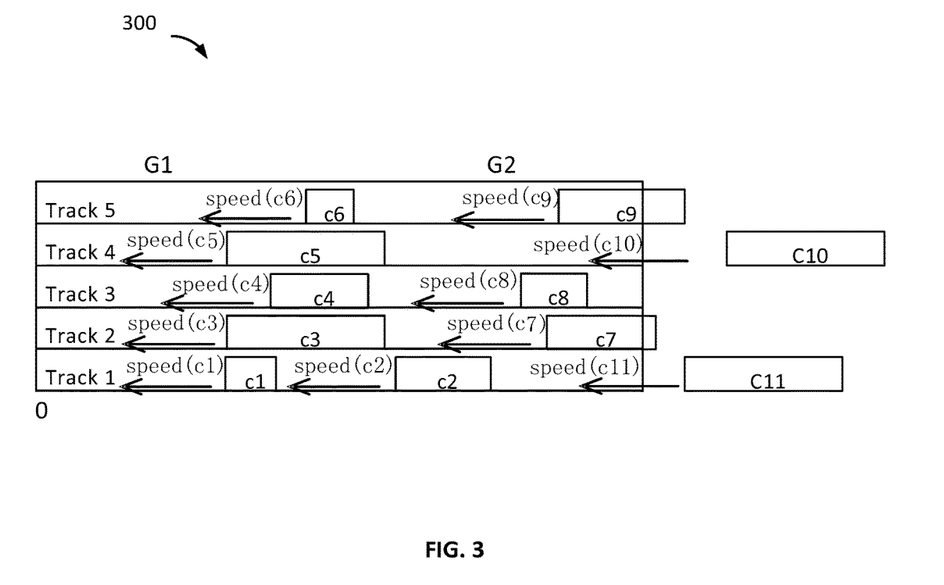
FIG. 3 is a diagram of subtitle data displayed on tracks according to various embodiments of the present application.

FIG. 3 is a diagram of subtitle data displayed on tracks according to various embodiments of the present application.

Referring to FIG. 3, multiple tracks displaying content 300 are provided. Multiple tracks displaying content 300 can be displayed on a client terminal's screen as a part of the browser and/or audio/video display application.

The multiple tracks displaying content 300 can include Track 1, Track 2, Track 3, Track 4, and Track 5, each of which includes a display of corresponding content (e.g., subtitle data). The content within the tracks (e.g., Track 1, Track 2, Track 3, Track 4, and Track 5) can be displayed at different speeds. For example, the speed at which the subtitle data is displayed in a particular track of the multiple tracks displaying content 300 can be determined independent of the other tracks.

As shown in FIG. 3, because speeds of subtitle motion differ, a situation might occur in which subtitle data displayed in the back (e.g., subtitle data to be displayed later, or otherwise being associated with a later display time in relation to the played object) is moving and passes (e.g., overlaps with) subtitle data displayed in the front (e.g., subtitle data to be displayed earlier, or otherwise being associated with an earlier display time in relation to the played object). In some embodiments, the distance and display time of the subtitle content displayed in the back is controlled relative to subtitle content displayed in the front on the same track. The distance or display time of the subtitle content displayed in the back can be controlled relative to the subtitle content displayed in the front such that the subtitle content displayed in the back is controlled to not pass the subtitle content displayed in the front on the same track. For example, in track 1, the speeds of subtitles C1 and C2 are controlled such that C2 will not go past C1 while both subtitles are displayed.

In some embodiments, the system can compute whether subtitle content can be displayed relative to preceding subtitle content and subsequent subtitle content that are to be displayed on the same track. For example, the distance or display time of subtitle content can be computed before display of the subtitle content.

Figure 4:
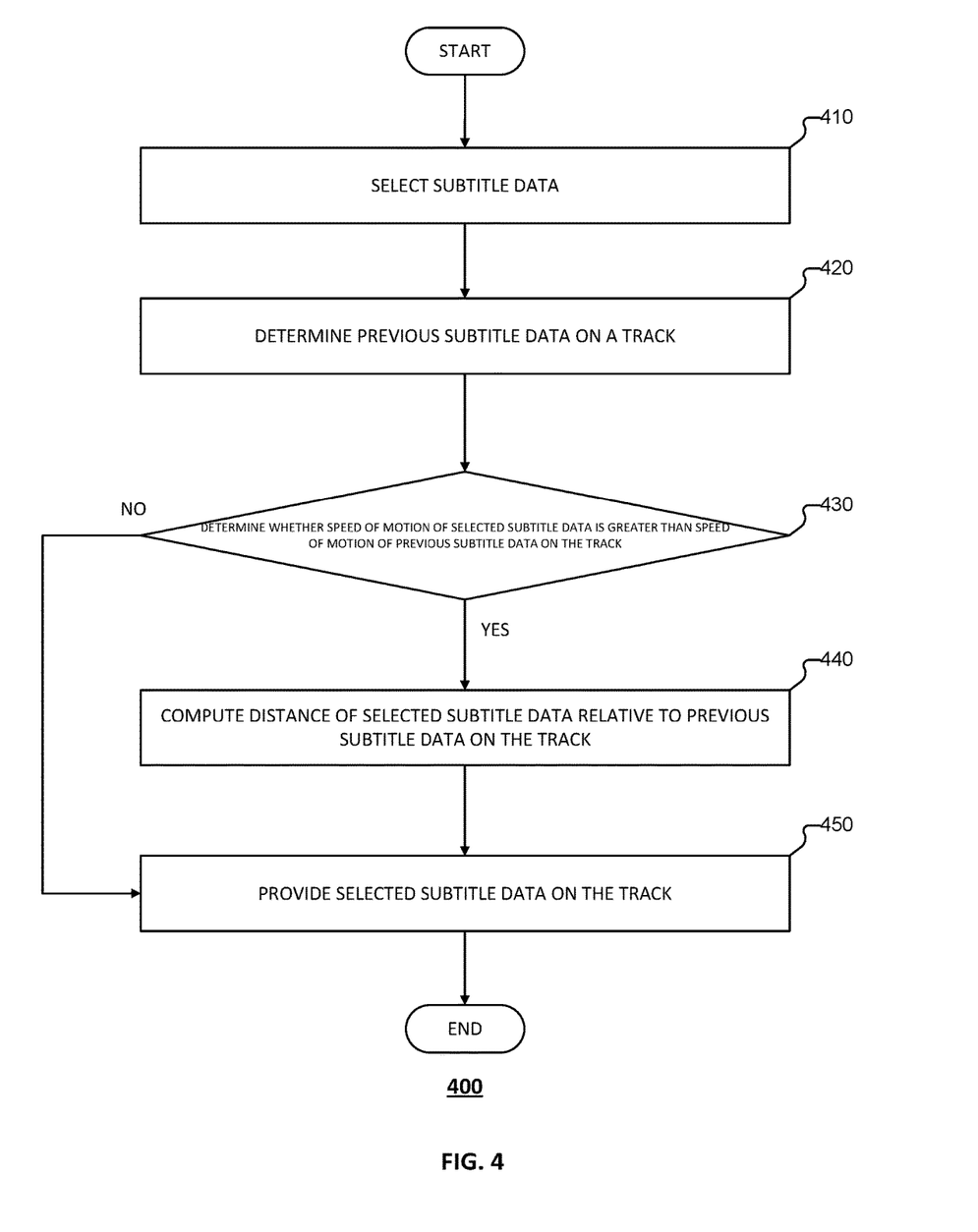
FIG. 4 is a flowchart of subtitle data displayed on tracks with reference to speeds of subtitle motion according to various embodiments of the present application.

FIG. 4 is a flowchart of subtitle data displayed on tracks with reference to speeds of subtitle motion according to various embodiments of the present application.

Referring to FIG. 4, a process 400 for processing subtitle data is provided. In some embodiments, process 400 can be implemented by system 500 of FIG. 5. Process 400 can be implemented by a client on which content is played or by a server that provides the content that is played.

According to various embodiments, the providing (e.g., displaying) of a subtitle data is managed (e.g., controlled) such that the subtitle data is displayed so as to not pass, or overlap with, previous subtitle data (e.g., subtitle data occurring before the subtitle data being managed). For example, when subtitle data is displayed on tracks, the speed of subtitle motion is referenced, such that the subtitle content displayed in the back does not pass the subtitle content displayed in front (e.g., the previous subtitle data) on the same track.

At 410, subtitle data is selected. In some embodiments, one subtitle data entry from a subtitle group is selected. For example, a subtitle data entry of C1 through C6 is selected from subtitle group G1. The subtitle data entry can be selected in connection with managing (e.g., configuring) the subtitle data entry to be displayed on a track.

For example, in subtitle group G1, the first subtitle data C1 and C2 are already displayed and are moving on a track. At this point, subtitle data C3 is selected and is used to be displayed on the same track as subtitle data C1 and C2.

In the context of FIG. 3, a subtitle data entry C11 can be selected to be displayed on a particular track (e.g., track 1). As illustrated in FIG. 3, track 1 includes subtitle data C1 and C2 displayed earlier.

In some embodiments, in order for subtitle data to be selected, the subtitle data must satisfy equations 2, 3, and 4. For example, the subtitle data to be selected should meet the operating conditions. In some embodiments, only if the conditions defined by equations 2, 3, and 4are met can subtitle data be truly in line with the current time point in the current track. In some embodiments, the operating conditions used to confirm selection of subtitle data can include the length of each subtitle data, the track on which the subtitle data is to be displayed, and the run time (e.g., the start time) relative to video time of the played object.

At 420, a previous subtitle data is determined. For example, the subtitle data preceding the selected subtitle data (e.g., the last subtitle data entry) is determined. For example, the subtitle data immediately preceding the selected subtitle data is determined. In the context of FIG. 3, in the event that subtitle data entry C11 is selected to be displayed on track 1, the previous subtitle data, or the subtitle data preceding the selected subtitle data (e.g., the last subtitle data entry), is subtitle data C2.

If the current track is determined to not have subtitle data, the selected subtitle data is placed as the last subtitle data entry on the current track.

In contrast, if the current track is determined to already have the prior subtitle data C1 and the prior subtitle data C2 already moving sequentially on the track, the subtitle data preceding the selected subtitle data (e.g., last subtitle data entry) on the current track is determined to be C2.

At 430, a determination is made as to whether a speed of motion of the selected subtitle data is greater than a speed of motion of the previous subtitle data on the track. For example, it is determined whether the speed of motion of the selected subtitle data is greater than the speed of motion of the last subtitle data entry on the current track. In the event that the speed of motion of the selected subtitle data is greater than the speed of motion of the last subtitle data entry on the current track, at 440, a relative distance is computed.

At 440, a distance of the selected subtitle data relative to the previous subtitled data on the track is computed. In some embodiments, the speeds of subtitle data C2 and C3 can be compared (e.g., Speed(C2) and Speed(C3) are compared). In the event that Speed(C3) is greater than Speed(C2) (e.g., in the event that subtitle data C3 is placed (immediately) after subtitle data C2 and moves on the same track as subtitle data C2), subtitle data C3 will consequently pass subtitle data C2 which is displayed before subtitle data C3 along the track. If the subtitle data C3 is moving at a faster speed than subtitle data C2, is moving along the same track as subtitle data C2, and is placed after the subtitle data C2 (e.g., if the subtitle data C3 is to trail the subtitle data C2), then subtitle data C3 and C2 may overlap at a point along the track. The user browsing and viewing would be affected if the subtitle data C3 were to overlap or pass subtitle data C2. Accordingly, a relative distance between the selected subtitle data and the previous subtitle data on the track (e.g., a relative distance between the subtitle data C3 and the subtitle data C2) is computed. The relative distance between the selected subtitle data and the previous subtitle data on the track can be used in configuring the selected subtitle data to be provided on the track.

In the event that the speed of motion of the selected subtitle data (e.g., Speed(C3) corresponding to subtitle data C3) is less than or equal to the speed of motion of the last subtitle data entry on the current track (e.g., Speed(C2) corresponding to subtitle data C2), the selected data entry can be provided after the last data entry on the current track and the selected subtitle data entry can be displayed in motion (e.g., the selected subtitle data can move along the current track). For example, if the speed of motion of the selected subtitle data entry is less than or equal to the speed of motion of the previous subtitle data entry on the track on which the selected subtitle data is to be provided, the selected subtitle data can be provided on the track without changing a speed of the selected subtitle data.

As an example, a track is assumed to be parallel to the horizontal axis and to extend from the positive direction of the horizontal axis to the negative direction. Accordingly, the coordinates of the two ends of the track are [0,0] and [x,0], respectively. In the event that the speed of motion of the selected subtitle data (e.g., Speed(C3) corresponding to subtitle data C3) is less than or equal to the speed of motion of the last subtitle data entry on the current track (e.g., Speed(C2) corresponding to subtitle data C2), all that is necessary is to place the selected subtitle data after the last subtitle data entry on the current track.

$$X_{C3} >= X_{C2} + len(C2) >= 0 \quad (2)$$

Referring to Equation 2, $X_{C3}$ is the horizontal coordinate of the starting point of the selected subtitle data, $X_{C2}$ is the horizontal coordinate of the starting point of the last subtitle data entry on the current track, and len(C2) is the length of the last subtitle data entry on the current track. The horizontal coordinate $X_{C3}$ of the starting point of the selected subtitle data is greater than or equal to the sum of the horizontal coordinate $X_{C2}$ of the starting point of the last subtitle data entry on the current track and the length of the last subtitle data entry C2 on the current track, and it is greater than or equal to 0. If $X_{C3}$ were to be less than 0, the selected subtitle data C3 would not be properly displayed on the track. For example, at least part of the selected subtitle data C3 would not be able to be displayed on the track. Accordingly, part or all of the selected subtitle data C3 would be omitted from the display when providing the selected subtitle data C3 on the tack. In some implementations, in the event the selected subtitle data C3 cannot be properly displayed on the track, another subtitle data is selected. In the event that another subtitle data is selected because selected subtitle data C3 cannot be properly displayed on the track, the subtitle data C3 can be discarded.

The speed of motion of the selected subtitle data and the speed of motion of the last subtitle data entry on the current track can be used as a basis for determining the relative distance of the selected subtitle data to the last subtitle data entry on the current track.

Assuming that the track is parallel to the horizontal axis and moves (e.g., extends) from the positive direction of the horizontal axis to the negative direction, and the coordinates of the two ends of the track are [0,0] and [x,0], respectively, the relative distance M can be determined according to Equation 3. The relative distance M corresponds to the distance between subtitle data entries displayed on a particular track (e.g., the distance between the end of a preceding subtitle data entry and the beginning of a selected subtitle data entry to be displayed on a track).

$$M \geq \frac{(X_{C2} + len(C2)) * Speed(C3)}{Speed(C2)} - X_{C2} \quad (3)$$

Referring to Equation 3, $X_{C2}$ is the horizontal coordinate of the starting point of the last subtitle data entry on the current track, len(C2) is the length of the last subtitle data entry C2 on the current track, Speed(C2) is the speed of motion of the last subtitle data entry C2 on the current track, and Speed(C3) is the speed of motion of the selected subtitle data C3.

In some embodiments, multiple tracks exist. In the event that multiple tracks exist, after determining the relative distance between the selected subtitle data and the previous subtitle data (e.g., the last subtitle data), process 400 can further comprise determining whether the relative distance is greater than a threshold distance value. In the event that the relative distance is greater than a threshold distance, another track is selected as the current track, and the process 400 returns to 420 to determine the last subtitle data entry on the current track (e.g., the newly selected current track based on the relative distance being greater than the threshold distance). The threshold distance can be configurable (e.g., according to user preferences or settings).

Because the speeds of motion of subtitle data on the tracks can be different, in the event that the speed of motion of the selected subtitle data is relatively fast, and the speed of motion of the last subtitle data entry (e.g., the previous subtitle data) on the track is relatively slow, the determined relative distance will be relatively large so as to avoid the subtitle content displayed in back (e.g., the later displayed subtitle content) from passing up the subtitle content displayed in front (e.g., the earlier or previously displayed subtitle content) on the same track. A relative distance exceeding a threshold distance can be deemed inefficient (e.g., track display space is wasted). In order to reduce the inefficiencies associated with the use of track space, in the event that the relative distance is determined to be greater than the threshold distance value, another track is selected as the current track. An alternative track is selected as the current track for display of the selected subtitle data in order to improve the use of track display space.

At 450, the selected subtitle data is provided on the current track. The selected subtitle data can be provided (e.g., placed) as the last subtitle data entry on the current track. The selected subtitle data can be provided on the current track according to the relative distance between the selected subtitle data and the previous subtitle data. For example, distance of the selected subtitle data from the last subtitle data entry on the current track is greater than or equal to the relative distance (e.g., the relative distance computed at 440).

Assuming subtitle data C3 corresponds to the selected subtitle data, the selected subtitle data C3 is provided as the last subtitle data entry on the current track. The distance of the selected subtitle data C3 to the last subtitle data entry on the current track is greater than or equal to the relative distance M. The horizontal coordinate of the starting point of the subtitle data C3, XC3, can be determined according to Equation 4.

$$X_{C3} = X_{C2} + len(C2) + M \quad (4)$$

If multiple tracks exist, at 420, it can also be determined whether the current track has been filled. If the current track has been filled, then another track that has not been filled is selected as the current track, and the previous subtitle data on the newly selected current track can be determined.

The determination of whether the current track has already been filled can be determined according to quantity of subtitle data and total length, or various other subtitle or track characteristics.

In some embodiments, after the last subtitle data entry on the current track is determined at 420, a determination is made as to whether the current track has already been filled. The determination of whether the current track has already been filled can be based at least in part on the coordinates of the last subtitle data entry on the track.

For example, assuming that a track is parallel to the horizontal axis and moves (e.g., extends) from the positive direction of the horizontal axis to the negative direction, the coordinates of the two ends of the track are [0,0] and [x,0], respectively. Further assuming that the coordinates of the last subtitle data entry on the track are [z,0] and that z is N times the value x, wherein N may be set at a value greater than 1, then the track can be determined to already be full. For example, the length of the previous subtitle data provided on the track extends a length that is greater than the track. Accordingly, no space remains for providing the selected subtitle data. If further subtitle data is to be placed on this track, then further time is required to pass (e.g., in order for the previous subtitle data to scroll) before the subtitle data can be displayed in motion. At this point, another track can be selected to serve as the current track to allow for the selected subtitle data to be displayed on a track at an appropriate time in the played object (e.g., rather than wait for the previous subtitle data to continue to scroll on the track so as to create enough space on the track for the selected subtitle data). In some embodiments, the track selected to serve as the current track can be selected according to a quantity of subtitle data associated with the track. For example, a track with a small quantity of subtitle data can be selected as the current track.

According to various embodiments of the present disclosure, subtitle data is displayed on a track such that the subtitle content displayed in back (e.g., the later subtitle content) will not pass the subtitle content displayed in front (e.g., the previous subtitle content) on the same track. Accordingly, subtitle data displayed on a track does not overlap with other subtitle data displayed on the same track. Various embodiments efficiently use the subtitle display space on a track. For example, various embodiments, can display as much subtitle data as possible on a track.

Figure 5:
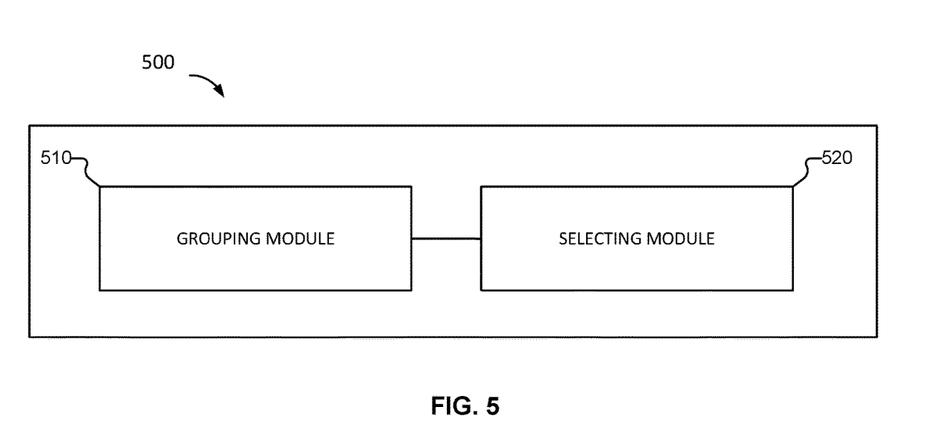
FIG. 5 is a block diagram of a system of processing subtitle data according to various embodiments of the present application.

FIG. 5 is a block diagram of a system of processing subtitle data according to various embodiments of the present application.

Referring to FIG. 5, a system 500 of processing subtitle data is provided. System 500 can be implemented in a server or a client terminal. System 500 can implement process 100 of FIG. 1.

System 500 includes a grouping module 510 and a selecting module 520.

The grouping module 510 is configured to divide subtitle data. The grouping module 510 can divide the subtitle data into multiple subtitle groups according to subtitle data display time information as the subtitle data display time information relates to the played object (e.g., content). Each subtitle group can include at least one subtitle data entry and each of the subtitle data entries can contain subtitle content, the subtitle data display time in relation to the played object, and the speed of subtitle motion.

The selecting module 520 is configured to select subtitle data. The selecting module 520 can select the subtitle data from a subtitle group according to the play time information of the played object. The selecting module 520 can use the selected subtitle data for display on a track (e.g., during playback of the played object). When the subtitle data is displayed on the track, the display of the subtitle data can be configured according to a speed of subtitle motion, such that the subtitle content that is to be displayed later (e.g., displayed in back) does not pass the subtitle content that is to be displayed earlier (e.g., displayed in front) on the same track.

In some embodiments, the system 500 includes a first determining module (not shown) that is configured to determine the subtitle groups according to a play time length of a played object.

In some embodiments, the system 500 includes a collecting module (not shown) that is configured to use, upon collecting new subtitle data, the subtitle data display time information in relation to the played object as a basis for determining whether a corresponding subtitle group exists. In the event that a corresponding subtitle group does exist, the collecting module adds the newly collected subtitle data to the corresponding subtitle group. In the event that no corresponding subtitle group exists, the collecting module establishes a new subtitle group and adds the newly collected subtitle data to the newly established subtitle group.

In some embodiments, the system 500 includes a second determining module (not shown) that is configured to determine the subtitle display time in relation to the played object according to the play time information of the current played object, or according to the difference between the subtitle publication time and the viewing start time.

In some embodiments, the speed of subtitle motion is positively related to the length of the subtitle content.

In some embodiments, the ratio of the length of the subtitle data to the speed of motion is a fixed value. In various implementations, the ratio of the length of the subtitle data to the speed of motion can be configurable (e.g., according to system or user settings/preferences).

In some embodiments, the system 500 includes a calculating module that is configured to calculate length of the subtitle data. The subtitle data can include subtitle font and/or font size information. Accordingly, the calculating module can calculate the length of the subtitle data according to the number of characters included in the subtitle data or according to the font size multiplied by the number of characters included in the subtitle data.

The selecting module 520 can be further configured to provide content on a subtitle track such that the subtitle content displayed in back (e.g., the later displayed content) does not pass, or overlap with, the subtitle content displayed in front (e.g., the earlier or previously displayed content) on the same track. The selecting module 520 can provide the content on the subtitle track according to the speed of the subtitle motion. The selecting module 520 selects one subtitle data entry from a subtitle group, determines the last subtitle data entry (e.g., the previous subtitle data entry) on the current track, determines a speed of the selected subtitle data, determines a speed of the last subtitle data entry on the current track, compares the speed of the selected subtitle data with the speed of the last subtitle data, and in the event that the speed of motion of the selected subtitle data is greater than the speed of motion of the last subtitle data entry on the current track, determines a relative distance using the speed of motion of the selected subtitle data and the speed of motion of the last subtitle data entry on the current track as a basis, and places (e.g., provides) the selected subtitle data as the last subtitle data entry on the current track in the event that the distance of the selected subtitle data to the last subtitle data entry on the current track is greater than or equal to the relative distance.

In some embodiments, the selecting module 520 is further configured to place the selected data entry after the last data entry on the current track and display the selected data entry in motion in the event that the speed of motion of the selected subtitle data is less than or equal to the speed of motion of the last subtitle data entry on the current track.

In the event that multiple tracks exist, the selecting module 520 can be further configured to determine whether the relative distance is greater than a threshold distance. If the relative distance is greater than the threshold distance, then the selecting module 520 can select another track as the current track, and determine the last subtitle data entry on the current track (the newly selected current track).

In the event that multiple tracks exist, the selecting module 520 can be further configured to, during determination of the last subtitle data entry on the current track, determine whether the current track has been filled. In the event that the current track has been filled, the selecting module 520 can select another track that has not been filled as the current track.

The system 500 can further include a third determining module (not shown). The third determining module is configured to use the coordinates of the last subtitle data entry on the track as a basis for determining whether the current track has been filled.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, or the like), including a number of instructions for making a computer device (such as personal computers, servers, network equipment, or the like) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 6:
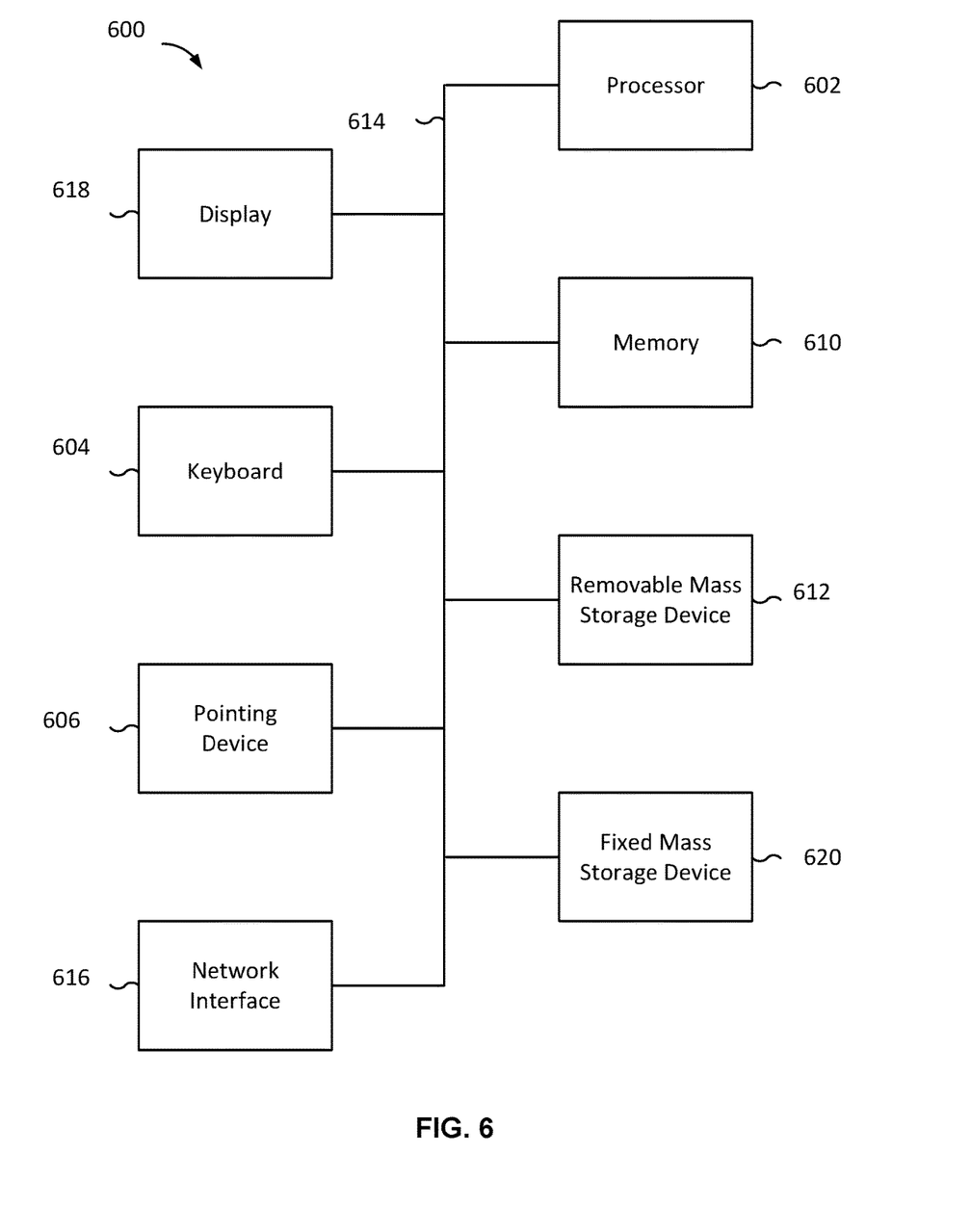
FIG. 6 is a functional diagram of a computer system for processing subtitle data according to various embodiments of the present application.

FIG. 6 is a functional diagram of a computer system for processing subtitle data according to various embodiments of the present application.

Referring to FIG. 6, a computer system 600 for processing subtitle data is provided. As will be apparent, other computer system architectures and configurations can be used to implement video calls. Computer system 600, which includes various subsystems as described below, includes at least one microprocessor subsystem (also referred to as a processor or a central processing unit (CPU)) 602. For example, processor 602 can be implemented by a single-chip processor or by multiple processors. In some embodiments, processor 602 is a general purpose digital processor that controls the operation of the computer system 600. Using instructions retrieved from memory 610, the processor 602 controls the reception and manipulation of input data, and the output and display of data on output devices (e.g., display 618).

Processor 602 is coupled bi-directionally with memory 610, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 602. Also as is well known in the art, primary storage typically includes basic operating instructions, program code, data, and objects used by the processor 602 to perform its functions (e.g., programmed instructions). For example, memory 610 can include any suitable computer-readable storage media, described below, depending on whether, for example, data access needs to be bi-directional or uni-directional. For example, processor 602 can also directly and very rapidly retrieve and store frequently needed data in a cache memory (not shown). The memory can be a non-transitory computer-readable storage medium.

A removable mass storage device 612 provides additional data storage capacity for the computer system 600, and is coupled either bi-directionally (read/write) or uni-directionally (read only) to processor 602. For example, storage 612 can also include computer-readable media such as magnetic tape, flash memory, PC-CARDS, portable mass storage devices, holographic storage devices, and other storage devices. A fixed mass storage 620 can also, for example, provide additional data storage capacity. The most common example of mass storage 620 is a hard disk drive. Mass storage device 612 and fixed mass storage 620 generally store additional programming instructions, data, and the like that typically are not in active use by the processor 602. It will be appreciated that the information retained within mass storage device 612 and fixed mass storage 620 can be incorporated, if needed, in standard fashion as part of memory 610 (e.g., RAM) as virtual memory.

In addition to providing processor 602 access to storage subsystems, bus 614 can also be used to provide access to other subsystems and devices. As shown, these can include a display monitor 618, a network interface 616, a keyboard 604, and a pointing device 606, as well as an auxiliary input/output device interface, a sound card, speakers, and other subsystems as needed. For example, the pointing device 606 can be a mouse, stylus, track ball, or tablet, and is useful for interacting with a graphical user interface.

The network interface 616 allows processor 602 to be coupled to another computer, computer network, or telecommunications network using a network connection as shown. For example, through the network interface 616, the processor 602 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 602 can be used to connect the computer system 600 to an external network and transfer data according to standard protocols. For example, various process embodiments disclosed herein can be executed on processor 602, or can be performed across a network such as the Internet, intranet networks, or local area networks, in conjunction with a remote processor that shares a portion of the processing. Additional mass storage devices (not shown) can also be connected to processor 602 through network interface 616.

An auxiliary I/O device interface (not shown) can be used in conjunction with computer system 600. The auxiliary I/O device interface can include general and customized interfaces that allow the processor 602 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 6 is but an example of a computer system suitable for use with the various embodiments disclosed herein. Other computer systems suitable for such use can include additional or fewer subsystems. In addition, bus 614 is illustrative of any interconnection scheme serving to link the subsystems. Other computer architectures having different configurations of subsystems can also be utilized.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   receiving, by one or more processors, one or more pieces of subtitle data from one or more subtitle sources;
   associating, by one or more processors, the one or more pieces of subtitle data with one or more subtitle groups of multiple subtitle groups associated with a played object, wherein a subtitle group comprises at least one subtitle data entry, and a corresponding one of the at least one subtitle data entry comprises subtitle content, and a subtitle display time in relation to the played object;
   selecting, by one or more processors, a piece of subtitle data from a subtitle group of the multiple subtitle groups according to the display time information of the played object; and
   outputting, by one or more processors, the selected piece of subtitle data in motion on a track such that the selected piece of subtitle data does not overlap with or pass another piece of subtitle data displayed on the track based at least on an analysis of a last subtitle data, a speed of motion of the selected piece of subtitle data, and a speed of motion of the last subtitle data entry on the track.

2. The method of claim 1, wherein the one or more subtitle groups with which the one or more pieces of subtitle data are associated is selected based at least in part on a time at which the one or more pieces of subtitle data are published.

3. The method of claim 1, wherein the one or more pieces of subtitle data are received from a plurality of users.

4. The method of claim 1, wherein the one or more pieces of subtitle data are received in connection with a broadcast or playback of content.

5. The method of claim 4, wherein the content corresponds to the played object.

6. The method of claim 1, further comprising:
   dividing, by one or more processors, subtitle data into multiple subtitle groups according to subtitle data display time information related to a played object.

7. The method of claim 1, wherein the selected piece of subtitle data is displayed based at least on a speed of the subtitle motion corresponding to the selected piece of subtitle data in relation to a speed of the subtitle motion corresponding to at least one other subtitle data entry.

8. The method of claim 1, wherein the selected piece of subtitle data is displayed on the track based at least on the speed of subtitle motion.

9. The method of claim 1, wherein the subtitle groups are determined based at least on a display time length of the played object.

10. The method of claim 1, wherein the receiving of the one or more subtitle data items comprises:
    collecting a new piece of subtitle data;
    in response to collecting the new piece of subtitle data, determining whether a subtitle group corresponding to display time associated with the new piece of subtitle data exists; and
    in response to a determination that the corresponding subtitle group exists, adding the new piece of subtitle data to the corresponding subtitle group; or
    in response to a determination that the corresponding subtitle group does not exist, establishing a new subtitle group and adding the new piece of subtitle data to the established new subtitle group.

11. The method of claim 1, wherein the subtitle display time in relation to the played object is determined according to the display time information of the played object or is determined according to a difference between a publication time of the subtitle data and a viewing start time.

12. The method of claim 1, wherein the speed of subtitle motion is proportional to a length of the subtitle content.

13. The method of claim 1, wherein a ratio of a length of the subtitle data to the speed of subtitle motion has a fixed value.

14. The method of claim 1, wherein the subtitle data further comprises at least one of a subtitle font or font size information, and wherein a length of the subtitle data is calculated according to a number of characters included in the subtitle data or according to a font size multiplied by the number of characters included in the subtitle data.

15. The method of claim 1, wherein the subtitle data further comprises subtitle publication time points.

16. The method of claim 1, wherein in response to a determination that a subtitle group has multiple subtitle data from which to choose the subtitle data, the selecting subtitle data includes selecting the subtitle data based at least on a corresponding time of publication associated with multiple subtitle data from which to choose the selected subtitle data.

17. The method of claim 16, wherein a piece of subtitle data corresponding to a more recent publication time is given a higher selection priority than another piece of subtitle data corresponding to a less recent publication time.

18. The method of claim 1, wherein the display of the selected piece of subtitle data on the track comprises:
    determining a last subtitle data entry on the track;
    determining whether a speed of motion of the selected piece of subtitle data is greater than a speed of motion of the last subtitle data entry on the track;
    in response to a determination that the speed of motion of the selected piece of subtitle data is greater than the speed of motion of the last subtitle data entry, determining a relative distance of the selected piece of subtitle data to the last subtitle data entry on the track using the speed of motion of the selected piece of subtitle data and the speed of motion of the last subtitle data entry on the track; and
    placing the selected piece of subtitle data on the track, wherein distance of the selected subtitle data to the last subtitle data entry on the track is greater than or equal to the relative distance.

19. The method of claim 18, further comprising, in response to a determination that the speed of motion of the selected piece of subtitle data is less than or equal to the speed of motion of the last subtitle data entry on the track, placing the selected piece of subtitle data after the last data entry on the track and displaying the selected subtitle data in motion.

20. The method of claim 18, wherein the track is one of a plurality of tracks configured to display subtitle data, and further comprising: determining whether the relative distance is greater than a threshold distance, and in response to a determination the relative distance is greater than the threshold distance, selecting another track among the plurality of tracks as a new track, and determining a last subtitle data entry on the new track.

21. The method of claim 18, wherein the track is one of a plurality of tracks configured to display subtitle data, and wherein the determining the last subtitle data entry on the track comprises determining whether the track has been filled, and in response to a determination that the track has been filled, selecting another track that has not been filled as the track.

22. The method of claim 21, wherein the determining of whether the track has been filled is based at least on coordinates of the last subtitle data entry on the track.

23. A system, comprising:
at least one processor configured to:
receive one or more pieces of subtitle data from one or more subtitle sources;
associate the one or more pieces of subtitle data with one or more subtitle groups of multiple subtitle groups associated with a played object, wherein a subtitle group comprises at least one subtitle data entry, and a corresponding one of the at least one subtitle data entry comprises subtitle content, and a subtitle display time in relation to the played object;
select a piece of subtitle data from a subtitle group of the multiple subtitle groups according to the display time information of the played object; and
output the selected piece of subtitle data in motion on a track such that the selected piece of subtitle data does not overlap with or pass another piece of subtitle data displayed on the track based at least on an analysis of a last subtitle data, the speed of motion of the selected piece of subtitle data, and the speed of motion of the last subtitle data entry on the track; and a memory coupled to the at least one processor and configured to provide the at least one processor with instructions.

24. A computer program product, the computer program product being embodied in a non-transitory computer readable storage medium and comprising computer instructions, when executed by at least one processor perform:
receiving one or more pieces of subtitle data from one or more subtitle sources;
associating the one or more pieces of subtitle data with one or more subtitle groups of multiple subtitle groups associated with a played object, wherein a subtitle group comprises at least one subtitle data entry, and a corresponding one of the at least one subtitle data entry comprises subtitle content, and a subtitle display time in relation to the played object;
selecting a piece of subtitle data from a subtitle group of the multiple subtitle groups according to the display time information of the played object; and
outputting the selected piece of subtitle data in motion on a track such that the selected piece of subtitle data does not overlap with or pass another piece of subtitle data displayed on the track based at least on an analysis of a last subtitle data, a speed of motion of the selected piece of subtitle data, and a speed of motion of the last subtitle data entry on the track.

25. The method of claim 1, wherein the corresponding one of the at least one subtitle data entry further comprises: information pertaining to a speed of a subtitle motion, the information pertaining to the speed of the subtitle motion being used in connection with a determination of a speed at which to display the corresponding subtitle data entry in motion.

* * * * *